United States Patent [19]
Brady et al.

[11] Patent Number: 5,571,591
[45] Date of Patent: Nov. 5, 1996

[54] MAGNETIC FILM PATTERNING BY GERMANIUM OR SILICON DIFFUSION

[75] Inventors: Michael J. Brady, Brewster; Richard J. Gambino, Yorktown Heights; Ralph R. Ruf, New City, all of N.Y.

[73] Assignee: International Business Machines Corporation, Armonk, N.Y.

[21] Appl. No.: 396,285

[22] Filed: Feb. 27, 1995

Related U.S. Application Data

[63] Continuation of Ser. No. 877,937, May 1, 1992, abandoned.

[51] Int. Cl.$^6$ .............................. G11B 5/66; B32B 3/02; B32B 15/00
[52] U.S. Cl. .................... 428/65.3; 428/611; 428/641; 428/692; 428/694 T; 428/694 GR; 428/900
[58] Field of Search .................................. 428/692, 611, 428/641, 694 T, 694 GR, 900, 65.3

[56] References Cited

U.S. PATENT DOCUMENTS

| | | | |
|---|---|---|---|
| 3,420,756 | 1/1969 | Tevajima | 205/158 |
| 3,902,930 | 9/1975 | Sata et al. | 148/113 |
| 3,959,799 | 5/1976 | Gambino et al. | 430/524 |
| 4,556,597 | 12/1985 | Best et al. | 428/201 |
| 4,689,260 | 8/1987 | Briska et al. | 428/161 |
| 4,746,580 | 5/1988 | Bishop et al. | 428/557 |
| 4,774,130 | 9/1988 | Endo et al. | 528/216 |
| 4,935,278 | 6/1990 | Krounbi et al. | 428/65.5 |

FOREIGN PATENT DOCUMENTS 1443248  7/1976  United Kingdom .

OTHER PUBLICATIONS

Bajorek et al, "Magnetically Discrete But Physically Continuous Recording Tracks", IBM Tec. Disc. Bull., 18, 1641 (1975).
M. Hansen, "Constitution of Binary Alloys", McGraw–Hill Book Co., 1958, pp. 684–691 and title page.
R. P. Elliott, "Constitution of Binary Alloys, First Supplement", McGraw–Hill Book Co., 1965, pp. 423–424 and title page.
F. R. Shunk, "Constitution of Binary Alloys, Second Supplement", McGraw–Hill Book Co., pp. 337–338 and title page.

*Primary Examiner*—Leszek Kiliman
*Attorney, Agent, or Firm*—Robert M. Trepp; Ronald L. Drumheller

[57] ABSTRACT

A method and apparatus for storing data and for reducing the magnetic moment of a ferromagnetic material is provided incorporating a magnetic film, a blanket or patterned film of germanium adjacent the magnetic film, and means for heating the interface of the two films to at least 200° C. to permit diffusion of the germanium into the magnetic film and thereby reduce the magnetic moment. The invention overcomes the problem of forming recording tracks on storage media and patterning magnetic films for inductive and magneto resistive heads for retrieving data from moving storage media.

10 Claims, 6 Drawing Sheets

MAGNETIC FILM PATTERNING BY GERMANIUM OR SILICON DIFFUSION

This is a continuation of patent application Ser. No. 07/877,937, filed May 1, 1992 now abandoned.

FIELD OF THE INVENTION

This invention relates to ferromagnetic film, and more particularly, to a process for patterning ferromagnetic films by reducing the magnetic moment of the film outside and contiguous with the pattern.

BACKGROUND OF THE INVENTION

Present methods of patterning magnetic films consist of chemical etching, ion milling, and sputter etching. Some of the processes require precise control of both the etching time and the bias voltages to ensure complete removal of the magnetic material. Some applications where it is desirable to pattern magnetic films or to delineate magnetic circuits is for track formation in magnetic storage media, inductive heads for reading and writing into magnetic storage media, and magneto resistive heads for reading magnetic storage media. The formation of tracks of magnetic storage media eases the problem of head registration on the magnetic storage media and permits high density, data storage.

Recording tracks of magnetic storage media have been formed in the past by electrodepositing media through photoresist masks.

In a publication by C. H. Bajorek et al. entitled, "Magnetically discrete but physically continuous recording tracks", IBM Technical Disclosure Bulletin, Vol. 18. No. 5, pp. 1641 (1975), a process was described for forming discrete tracks of magnetic storage media from nonmagnetic amorphous $Fe_2O_3$ or $Fe_xCo_yO_3$ which may be deposited by sputtering, evaporation, or chemical vapor deposition. The layer may have a thickness of 1000 Å and have a pattern thereover of photoresist corresponding to the desired tracks. Next, a thin film of FeCo or Fe, Co is evaporated or sputtered to form a layer over the photoresist and the nonmagnetic film. A suitable resist solvent is used to lift the metal in unwanted areas while removing the resist. The residual structure is annealed to diffuse the Fe, Co or Fe-Co into the nonmagnetic layer and thus transform the nonmagnetic layer to a ferromagnetic $Fe_3O_4$ or $Fe_xCo_yO_4$. Metals not diffused into the layer are subsequently removed to form a uniform layer thickness of ferromagnetic tracks with nonmagnetic material therebetween.

Another approach for forming discrete tracks for a magnetic recording disk was described in U.S. Pat. No. 4,935,278 which issued on Jun. 19, 1990 to Krounbi et al. entitled, "Thin film magnetic recording disk and fabrication process" and assigned to the assignee herein. A thin film of magnetic material is formed on a substrate, patterned by sputter etching with a chemically etchable support layer and a high resolution photoresist layer. The removed portions of magnetic film are refilled with nonmagnetic material preferably by sputter deposition to form concentric nonmagnetic guard bands. The original magnetic film layer may be a magnetic cobalt-based alloy which may be sputter deposited to a thickness of approximately 300 Å. The substrate or disk may comprise an aluminum alloy disk with a surface film of nickel-phosphorous. The recording tracks of magnetic film and the nonmagnetic material therebetween may be covered by a top layer of nonmagnetic material which functions as a passivating and protective disk overcoat.

A further example of patterning magnetic films is described in U.S. Pat. No. 4,746,580 which issued on May 24, 1988 to R. W. Bishop ct al. entitled, "Read-only magnetic recording media" which is assigned to the assignee herein. In '580, discrete bits of high coercivity metal are formed by patterning resist on a substrate, depositing high coercivity metal, for example, an alloy of aluminum, nickel, and cobalt. The photoresist is chemically removed lifting off the metal over the resist leaving a defined pattern of discrete bits on the substrate. The substrate may be a thin nonmagnetic stainless steel about 0.002 inches thick or a polyester film. The discrete bits or metal islands are subjected to the influence of a steady-state magnetic field in order to convert the metal islands into a read-only data pattern which can be read by a magnetic head.

Outside the prior art of magnetic thin films but within the art or storage media, information can be stored in a suitable storage media by exposure to a focussed laser beam. In U.S. Pat. No. 3,959,799 which issued on May 25, 1976 to R. J. Gambino et al., entitled, "Information storage by laser beam initiated reaction", a storage media was provided initially comprising two adjacent thin layers of two or more materials which react upon heating to form a reaction product with optical, magnetic, or electrical properties different from the corresponding properties of the reactive materials. One example of a storage media is a layer of aluminum adjacent a layer of selenium. A laser may be focussed on selected areas of the layers wherein the heating clue to the laser results in a reaction product of $Al_2Se_3$. The storage media provides a relatively low cost read-only memory after information has been stored therein with a laser.

SUMMARY OF THE INVENTION

In accordance with the present invention, a method and apparatus for reducing the magnetic moment of a ferromagnetic material is described comprising the steps of first forming an interface of a surface of ferromagnetic material and a surface of a first material selected from the group consisting of germanium and silicon, and heating the interface to at least 150° C. whereby the first material diffuses into the ferromagnetic material and forms a second material including a binary compound of the ferromagnetic material and the first material which is nonmagnetic. Examples of ferromagnetic material may be material consisting of nickel, iron, and cobalt or alloy combinations thereof or alloys with other materials, for example, platinum. Examples of the binary compound may be $Ni_3$ Ge, $Fe_3$ Ge, $Co_2$ Ge and $Ni_3Si$.

It is an object of the invention to provide a method for forming a plurality of adjacent recording tracks of ferromagnetic material separated by a substantially nonmagnetic material.

It is a further object of the invention to provide a plurality of adjacent tracks of ferromagnetic material with nonmagnetic material therebetween having a substantially planar upper surface.

It is a further object of the invention to provide patterning of magnetic thin films used in an inductive head associated with reading magnetic films wherein the patterning provides high definition of the boundaries of the magnetic material.

It is a further object of the invention to provide a process for patterning magneto resistive films used in magneto resistive heads associated with reading data from magnetic thin films wherein superior pattern definition may be obtained and where an nonmagnetic material but planar and contiguous with the magneto resistive film provides electrical contact to the magneto resistive film.

The invention further provides an apparatus for storing data comprising a substrate, a first layer of silicon or germanium on a substrate, a second layer of first material on the layer of silicon or germanium, the first material selected from the group consisting of nickel, iron, and cobalt, the layer of first material having selected areas therein of a third material including a binary compound of the silicon or germanium and the first material. A multiplicity of such layers may be used. The invention further may include a means for heating selected areas of the layers to form the binary compound therein.

BRIEF DESCRIPTION OF THE DRAWINGS

These and other features, objects, and advantages of the present invention will become apparent upon a consideration of the following detailed description of the invention when read in conjunction with the drawing, in which.

DESCRIPTION OF THE PREFERRED EMBODIMENT

Figure 1:
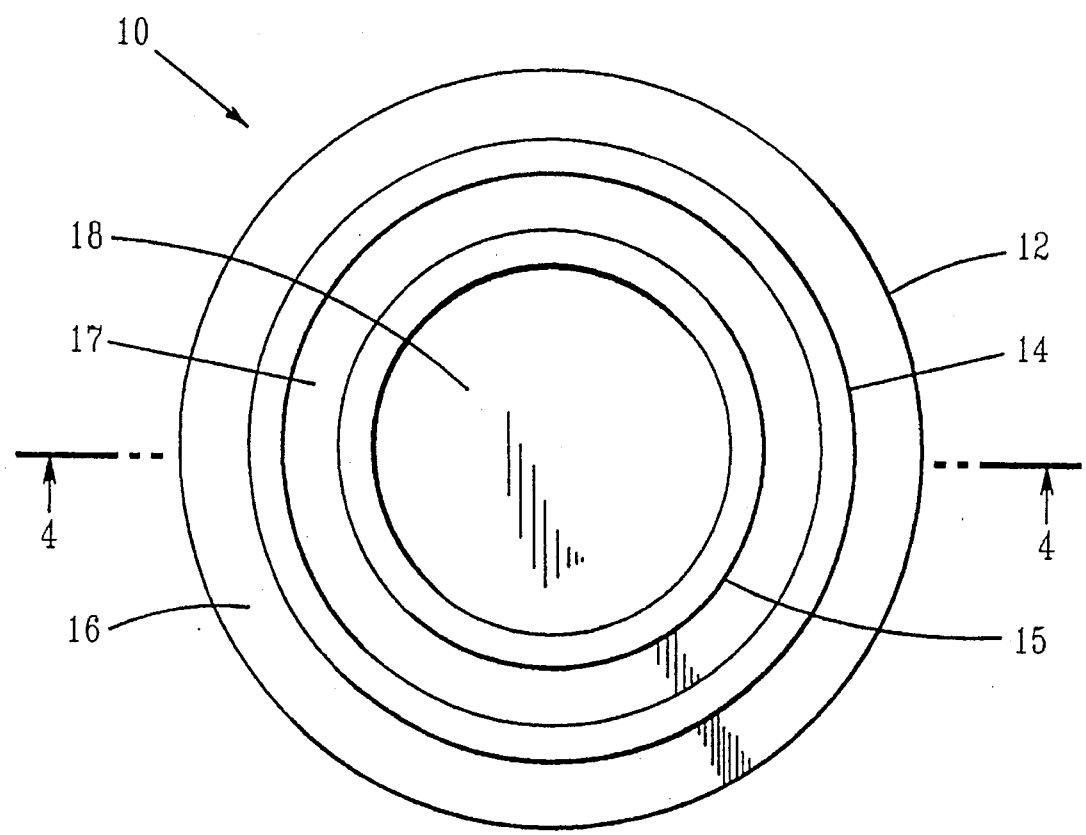
FIG. 1 shows one embodiment of the invention.

Referring to the drawing, FIG. 1 shows magnetic storage media 10 comprising a disc 12, recording tracks 16 and 17 separated by material 14 and 15 of reduced magnetic moment. Area 18 may consist of the same material as recording tracks 16 and 17. Magnetic storage media 10 may have additional recording tracks thereon such as 100,000 and disc 12 may have a diameter ranging from 1.27 cm (0.5 inches) to 26 cm (10.25 inches). Disc 12 may comprise aluminum, glass, or plastic. Recording tracks 16 and 17 may be selected from the group consisting of nickel, iron, and cobalt or alloys thereof. Material 14 and 15 may comprise a compound including an element in common with the element selected for the recording track to provide the magnetic, ferromagnetic, properties, e.g., nickel, iron, and cobalt. For example, if the principle element in recording tracks 16 and 17 was nickel, then material 14 and 15 may be $Ni_3$ Ge or $Ni_3Si$. If the principle element in recording tracks 16 and 17 is iron, then material 14 and 15 may be, for example, $Fe_3$ Ge or $Fe_3Si$. If the principle element in recording tracks 16 and 17 is cobalt, then material 14 and 15 may be, for example, $Co_2$ Ge or $Co_2Si$.

Figure 4:
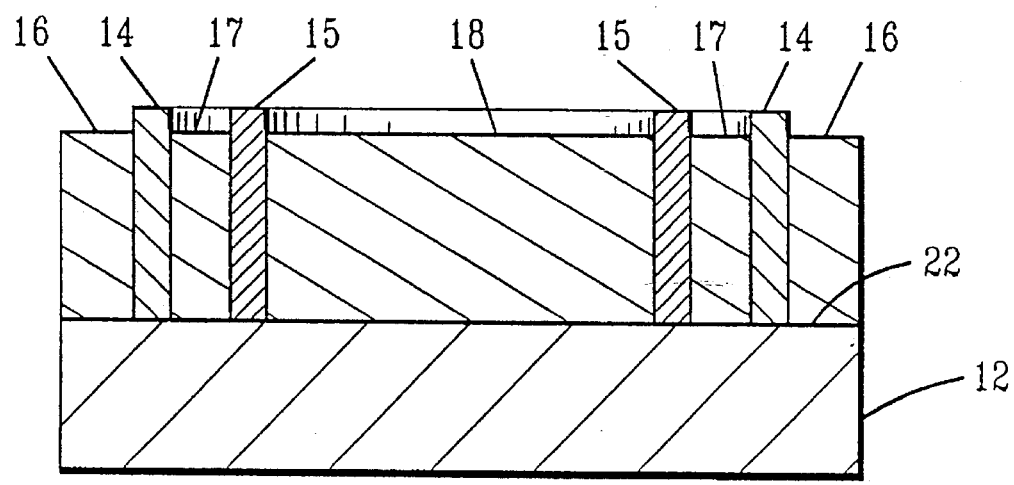
FIG. 4 is a cross-section view along the line 4—4 of FIG. 1.

FIG. 4 is a cross-section view along the line 4—4 of FIG. 1. FIGS. 1 and 4 illustrate magnetic storage media 10 having a plurality of recording tracks separated by nonmagnetic material useful for storing data magnetically.

Figure 2:
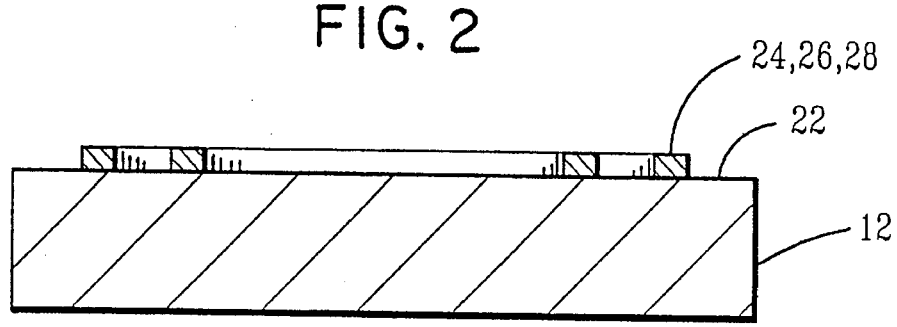
FIG. 2 is a cross-section view of patterned germanium illustrating a process step.

FIG. 2 shows a cross-section view of patterned germanium illustrating an intermediate process step in fabricating the embodiment shown in FIG. 1. Disc 12 may have a layer of photoresist formed on its upper surface 22 followed by exposing the photoresist (not shown) through a mask or pattern. The photoresist may be developed leaving openings in a photoresist layer exposing a surface 22 of disc 12. Next, a germanium layer 24 is formed such as by vapor deposition on the exposed upper surface 22 of disc 12 and on the remaining photoresist layer (not shown). Next, the photoresist is removed which in turn removes the portion of germanium layer 24 thereon by a lift-off process well known in the art and leaving patterned germanium layer 26 on upper surface 22 of disc 12. Next, a blanket layer of nickel, iron, cobalt, or an alloy thereof is blanket deposited, or plated from a slurry or applied from a slurry consisting of particles or powders over upper surface 22 of disc 12 and over upper surface 28 of patterned germanium layer 26.

The steps of forming a patterned layer of germanium and a blanket layer of nickel, iron, cobalt, or an alloy thereof may be repeated a number of times to provide a multilayer structure having a predetermined thickness.

The plating of nickel, iron, cobalt, or an alloy thereof may be accomplished to form a blanket layer by electroplating or by electroless plating which is well known in the art.

Figure 3:
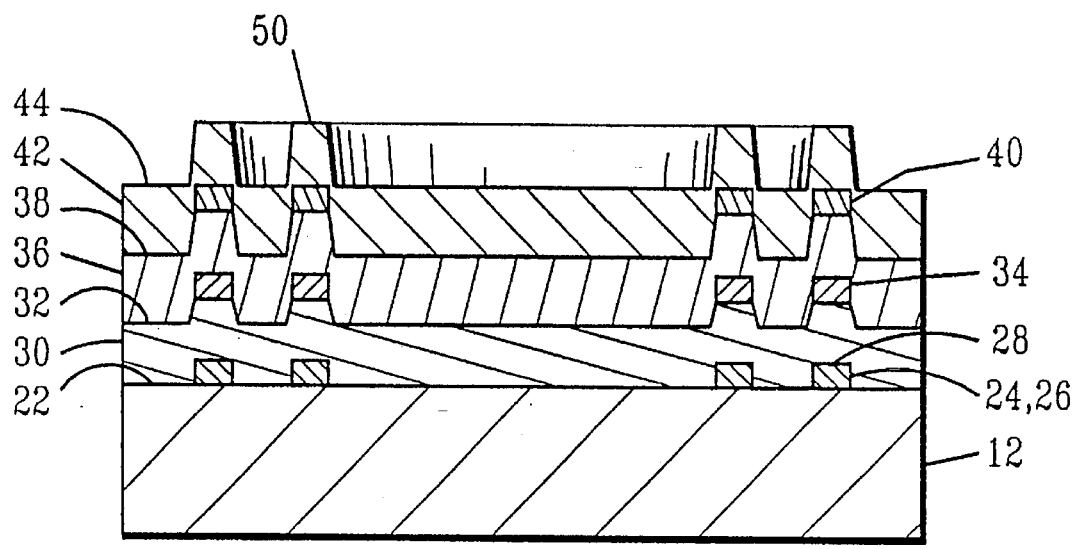
FIG. 3 is a cross-section view of a plurality of layers of nickel separated by patterned layers of germanium or silicon illustrating a process step.

FIG. 3 is a cross-section view of a plurality of thin layers of nickel, iron, cobalt, or alloys thereof over a respective patterned layer of germanium.

In FIG. 3, layer 30 of magnetic material is formed over patterned germanium layer 26. On upper surface 32 of magnetic metal layer 30 is formed a patterned germanium layer 34. A magnetic metal layer 36 is formed over patterned germanium layer 34 and on the exposed upper surface 32 of magnetic metal layer 30. Magnetic metal layer 36 has an upper surface 38. A patterned germanium layer 40 is formed on the upper surface 38 of magnetic metal layer 36. A magnetic metal layer 42 is formed over patterned germanium layer 40 and the exposed upper surface 38 of magnetic metal layer 36. Magnetic metal layer 42 has an upper surface 44. The combination of patterned germanium layers 26, 34, and 40 which may be registered relative to one another and identical relative to one another and with magnetic metal layers 30, 36, and 42 form a multilayer stack 50. Multilayer stack 50 may be heated to a temperature, for example, 200° C. to convert a stochiometic nickel/germanium bilayer or multilayers into $Ni_3$ Ge compound after a 2 hour, $7.2 \times 10^3$ seconds anneal. The thickness of the magnetic metal layers 30, 36, and 42 have approximately 3 times the thickness of patterned germanium layers 26, 34, and 40 respectively to provide a stochiometic balance to form the compound $Ni_3$ Ge. The same thickness as used for nickel would also apply if iron was used to form $Fe_3$ Ge. If magnetic metal layers 30, 36, and 42 are primarily cobalt, then the thickness would be twice the thickness of the respective patterned germanium layer 26, 34, and 40 to form $Co_2$ Ge. In place of patterned germanium layers 26, 34, and 40, a patterned silicon layer may be substituted in its place to form the corresponding compound with silicon, for example, $Ni_3Si$. The surfaces of patterned germanium layers 26, 34, and 40 and magnetic metal layers 30, 36, and 42 should be clean to provide a clean interface to adjacent layers to facilitate diffusion of the patterned germanium layers 26, 34, and 40 into the magnetic metal layers 30, 36, and 42. The step of annealing is done in-situ in a vacuum or in an inert gas. The step of annealing permits diffusion of germanium or silicon into the magnetic metal layers to form a solid state reaction forming phases or compounds with the magnetic metal layer which in turn substantially reduces the magnetic moment of the magnetic metal layer area affected. The thickness of the patterned germanium layers 26, 34, and 40, as well as magnetic metal layers 30, 36, and 42, may be adjusted so as to limit the diffusion length necessary for atomic diffusion of germanium into the magnetic metal layer which is primarily by the mechanism of substitutional diffusion. Thus, for lower anneal times, the multilayer stack 50 may have more layers which are thinner to provide the same total multilayer stack 50 thickness and have a shorter anneal time and better definition since the diffusion distance could be shorter to accomplish conversion of the magnetic metal layer area into the desired phase or compound, which has substantially reduced magnetic moment relative to the adjacent pure magnetic metal of nickel, iron, cobalt, or alloys thereof.

Germanium has a range of solubility in nickel, iron, cobalt, or alloys thereof of 10 atomic percent between the temperatures between 200° C. and 1200° C. Silicon can be substituted for germanium and, likewise, has a comparable solubility of 10 atomic percent in nickel, iron, cobalt, and alloys thereof, since the comparable phase diagrams of silicon and germanium are almost identical, with only a slight upward shift in respective melting points for the silicon phases. Therefore, the references herein to germanium will also apply to silicon.

Following the step of annealing the multilayer stack 50, recording tracks 16 and 17 are defined with material 14 and 15 adjacent thereto which is of substantially reduced magnetic moment relative to recording tracks 16 and 17 shown in FIGS. 1 and 4, wherein FIG. 4 is a cross-section view along the line 4—4 of FIG. 1.

Figure 5:
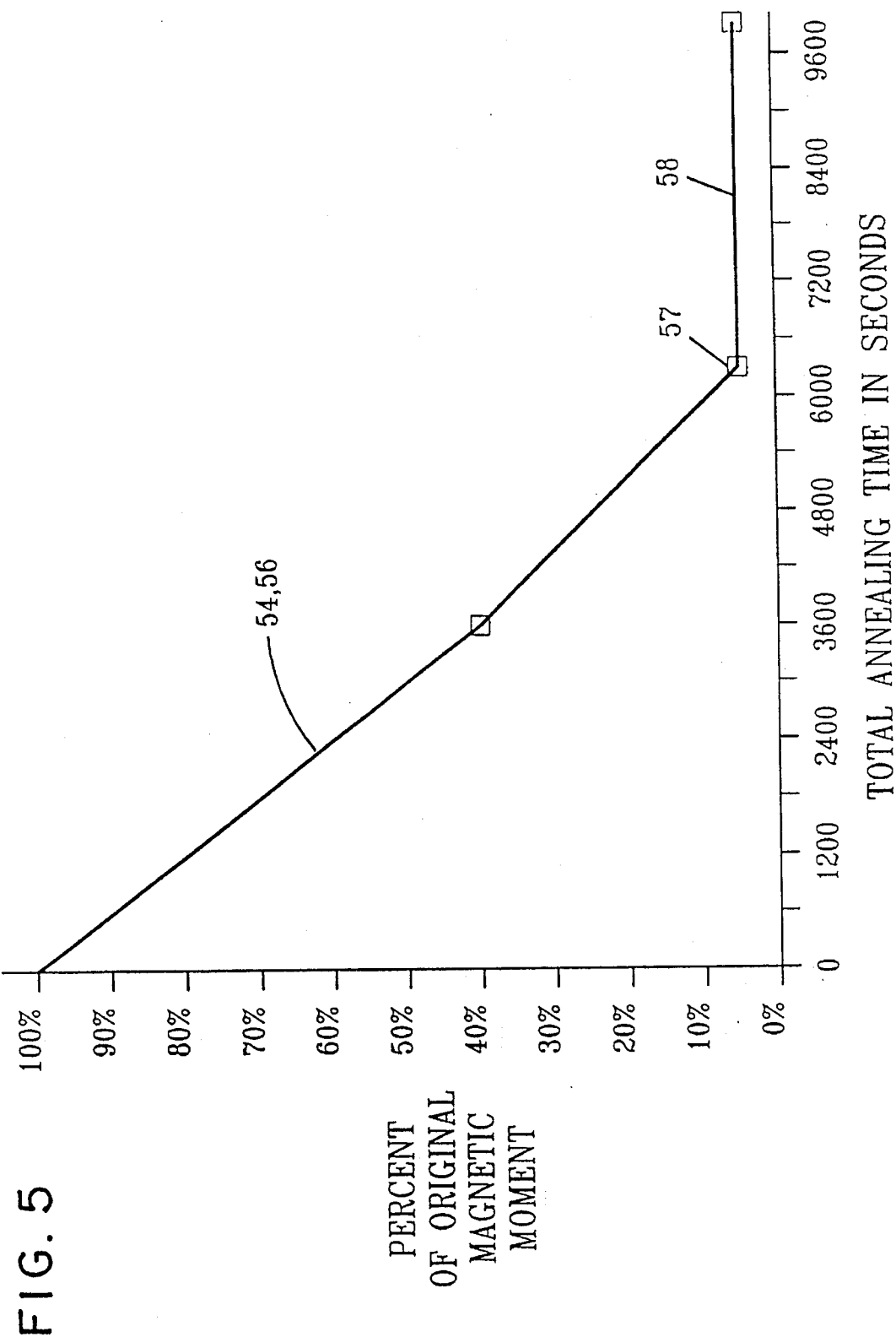
FIG. 5 is a graph of the percent of remaining magnetic moment versus total anneal time at 200° C.

FIG. 5 is a graph or the percent of remaining magnetic moment versus total anneal time at 200° C. In FIG. 5, the ordinate represents percent of original magnetic moment and the abscissa represents total annealing time in seconds. In FIG. 5, the data of reduced magnetization was obtained from a nickel/germanium bilayer which was annealed at 200° centigrade. Curve 54 shows the reduction in magnetic moment over time. Curve portion 56 or curve 54 shows the reduction of the magnetic moment from 100% to about 5% at point 0.57 after about 63 hundred (6300) seconds. Curve portion 56 is almost linear, i.e., almost a straight line. Curve portion 58 of curve 54 extends from 63 hundred (6300) to about 99 hundred (9900) seconds and is constant (horizontal) at 5% of original magnetic moment. The reduction in the magnetic moment is a consequence of germanium diffusing into nickel and forming $Ni_3 Ge$ which is nonmagnetic. If the annealing temperature is raised, the dilution of germanium will occur faster and curve portion 56 would extend from 100% to a point left or point 57 on the curve at the 5% value. If the temperature for annealing was reduced, the diffusion of germanium would be slower and curve portion 56 would extend from 100% at 0 seconds to a 5% value or reduced magnetic moment but to a point to the right or point 57. Inasmuch as germanium is diffusing into nickel by atomic substitution, the resulting compound $Ni_3 Ge$ results in about a 10% volume metric shrinkage in the final layer as compared to the original bilayer or nickel/germanium. The magnetic field in the material may be expressed by equation 1

$$\vec{B} = \vec{H} + 4\pi \vec{M} \quad (1)$$

where B is a magnetic field, it is the applied magnetic field, and where $4\pi M$ is the spontaneous magnetism of the material applicable to ferromagnetic material. Thus, a reduction in the original magnetic moment, shown in FIG. 5, is a reduction in the value M defined in equation 1. It is understood that B,H and M are vectors.

In addition to data obtained from a Ni/Ge bilayer, data was obtained from cobalt-germanium bilayer films. It is noted that cobalt has a higher Curie temperature Tc of about 1121° C. than nickel which has a Tc of 360° C. With the higher Curie temperature, it was believed that cobalt might require longer annealing times or higher temperatures to fully kill or reduce the magnetic moment of the material by forming $Co_2 Ge$.

Several bilayer cobalt-germanium films were formed by electron beam evaporation and annealed in situ at different temperatures to see how easy it was to kill or reduce the magnetic moment of cobalt by way of diffusion of germanium in forming $Co_2 Ge$. The results of annealing were very encouraging. For example, a 650 Å layer of cobalt was deposited on top of a 1350 Å thick layer of germanium on 3 different substrates. The films were annealed at 600° C., 400° C., and 200° C. for 3600 seconds (1 hr.). In each case no magnetic moment remained. The various cobalt-germanium intermetallic phases and cobalt-germanium solid solutions that formed were all nonmagnetic. The unannealed reference of cobalt on germanium showed the expected moment and crystal structure of pure cobalt. It is possible that temperatures less than 200° C. and times less than 3600 seconds (1 hr.) would also produce nonmagnetic material. The data from the diffusion of germanium into cobalt compares very favorably with the data on the diffusion of germanium into nickel. It appears that cobalt is a more likely material to be used in future magnetic storage media.

Figure 6:
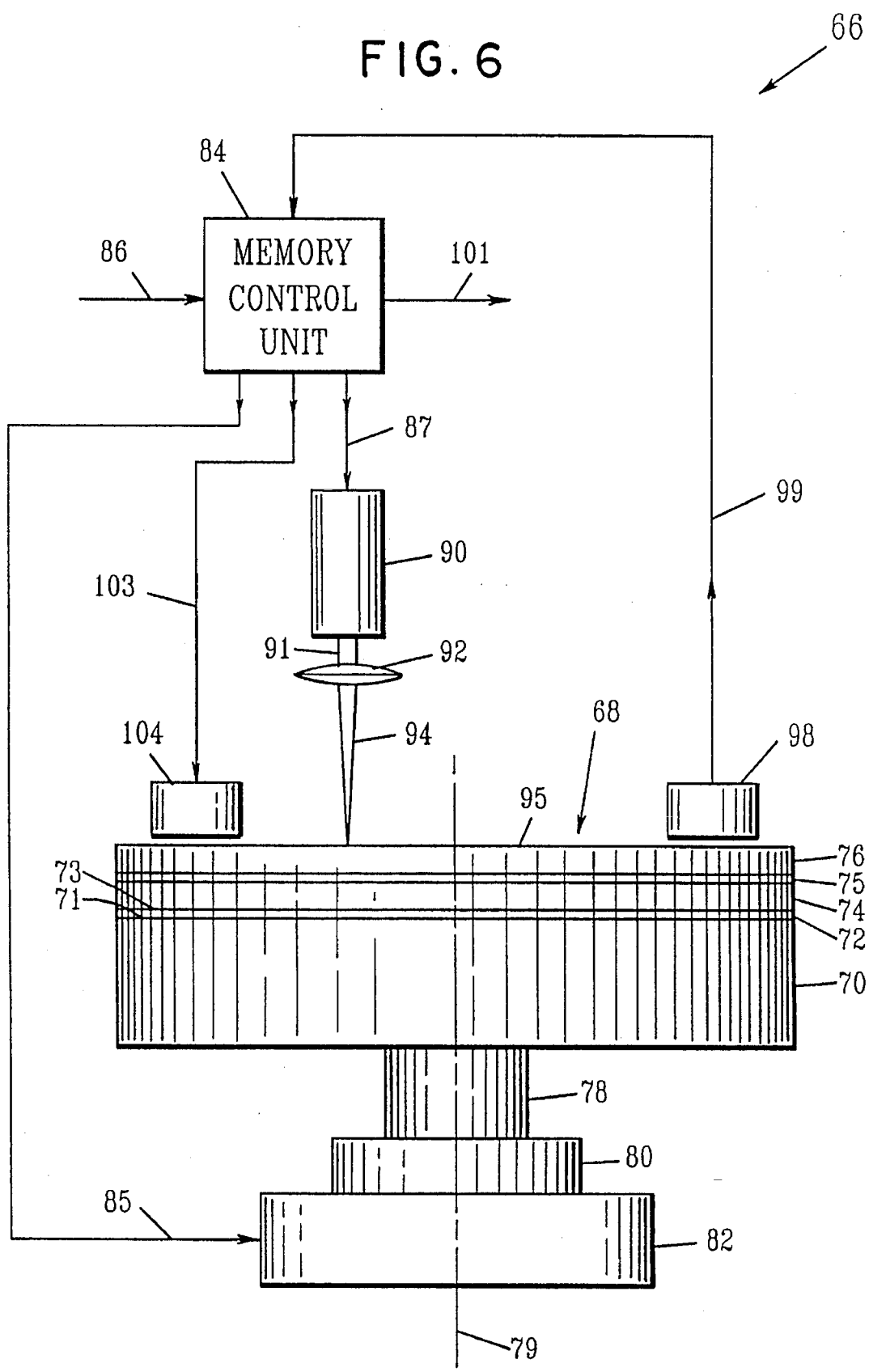
FIG. 6 is an alternate embodiment of the invention.

FIG. 6 shows a memory system 66 for storing and retrieving data from a storage medium 68. Storage media 68 may comprise a disc 70 having a layer 72 of germanium formed on its upper surface 71. A layer 74 of nickel is formed on upper surface 73 of layer 72. Layer 74 may have a material selected from the group consisting of nickel, iron, cobalt, and alloys thereof. Layer 72 may consist of a material selected from the group consisting of germanium and silicon. The thicknesses of the layers 72 and 74 may be adjusted to provide a stochiometic balance for the expected compounds to be formed in the event a selected area is annealed. Disc 70 may be supported by spindle 78 which rotates disc 70 clockwise at a speed of, for example, 3600 RPM, 60 revolutions per second. Spindle 78 is supported by bearing 80 and is rotated by motor 82. A memory control unit 84 provides control signals over lead 85 to motor 82.

Data to be stored is provided over lead 86 to an input of memory control unit 84. Memory control unit 84 provides control signals and data signals over lead 87 to an input of write laser 90. Write laser 90 functions to provide a laser beam 91 which passes through lens 92 to provide a focussed laser beam 94 which is focussed on upper surface 95 of storage media 68. Focussed laser beam 94 provides localized heating of layers 72 and 74 at a temperature to permit germanium to diffuse into the layer of nickel 74 which forms compounds or solutions which have a reduced magnetic moment. Focussed laser beam 94 may store data at a plurality of positions on storage media 68 by applying an individual focussed laser beam 94 or a patterned beam by projection through a mask onto storage media 68 to provide a plurality of data points concurrently. Focussed laser beam 94 provides localized heating to selected areas on storage media 68 and other means to provide localized heating on storage media 68 may be used without departing from the spirit or this invention.

Data may be retrieved from storage media 68 by sensor 98 which may be a magneto optic sensor or a magnetic sensor which may utilize an inductive head or a magneto resistive head. The output or the sensor 98 is coupled over lead 99 to an input or memory control unit 84 which provides an output over lead 101.

In a more conventional approach, memory control unit 84 may provide write data over lead 103 to a write head 104. Write head 104 functions to write data magnetically into storage media 68 which is well known in the art. Write laser 90 or a substituted heat source may be used to provide recording tracks in storage media 68 by forming nonmagnetic material on either side of a desired recording track by heating the respective areas to cause germanium to diffuse into the nickel to reduce the magnetic moment. The recording tracks may be formed by a heat source on storage media 68 prior to inserting disc 70 onto spindle 78 in memory system 66.

Figure 8:
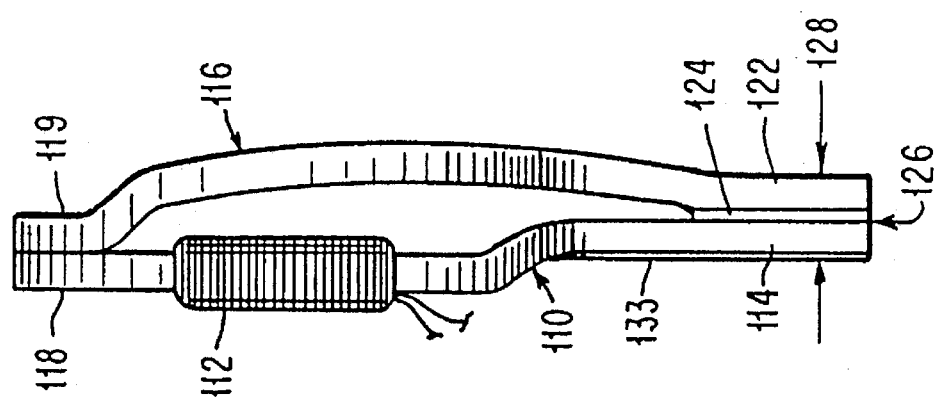
FIG. 8 is a side view of FIG. 7.
Figure 7:
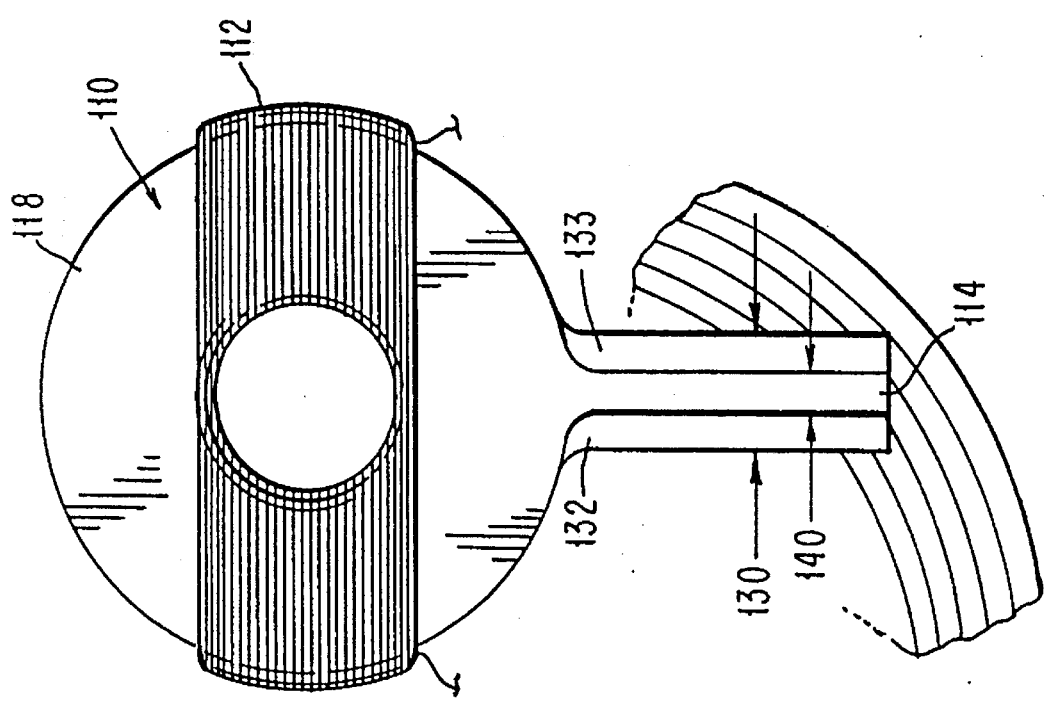
FIG. 7 is a view of an inductive head suitable for retrieving data from storage media on a disc.

FIG. 7 is a front view of an inductive read head for retrieving data from storage media on a disc. FIG. 8 is a side view or FIG. 7. FIG. 7 shows a shaped or patterned magnetic film 110 which is also shown in FIG. 8 having a generally uniform thickness. A coil 112 is wrapped around magnetic film 110 to provide an applied magnetic field H in the material directed to tip 114. A patterned magnetic film 116 which may have a shape similar to magnetic film 110 have their major surfaces positioned adjacent one another. At the top 118 of film 110 and top 119 of film 116, the films are joined together to provide a continuous magnetic path from film 110 to film 116.

At tip 114 of magnetic film 110 and tip 122 of magnetic film 116, the films are brought very close together but separated by a dielectric 124 to provide a gap between magnetic films 110 and 116. The lower end of magnetic films 110 and 116 at end 126 the field extends beyond end 126 and senses the magnetic field and storage media adjacent to end 126. The thickness of end 126 shown by arrow 128 is generally not a problem in fabrication. However, the width of end 126 and tips 114 and 122 shown by arrow 130 is a problem in that the width is greater than desired.

According to the invention, a layer of germanium or silicon may be formed and patterned on magnetic film 110 and magnetic film 116 which would be comparable as shown for magnetic film 110. As shown in FIG. 7, patterned germanium 132 and 133 on the sides of tip 114 and on 122 (not shown) provide a means for narrowing the width of tip 114, tip 122 and end 126 with respect to the magnetic field passing therethrough. By heating patterned germanium 132 and 133, the germanium diffuses into the magnetic film 110 and likewise into 116 with respective germanium areas. The magnetic films 110 and 116 are narrowed as shown by arrow 140. While the physical width remains as shown by arrow 130, the magnetic width of magnetic film 110 and also 116 would have a width shown by arrow 140. Thus, the magnetic field extending from end 126 would be extending from end 126 having a width shown by arrow 140. The width of arrow 140 would correspond to the width of a recording track in storage media as it passed underneath end 126.

Figure 9:
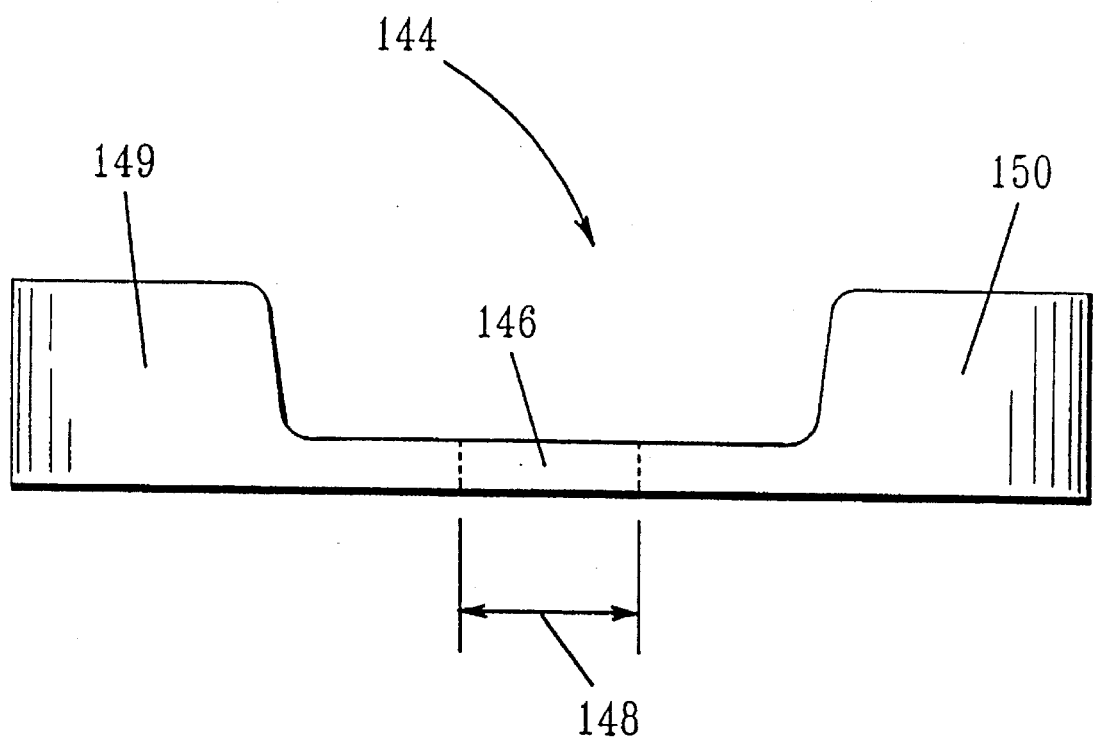
FIG. 9 is a view of a magneto resistive head for retrieving data from storage media on a disc.

FIG. 9 is a front view of a magneto resistive head 144. By utilizing the invention described herein, the magnetic film may be optimally patterned for detecting bits in a recording track on storage media where the width of the recording track is shown by arrow 148. Germanium may be formed on the magnetic film in areas desired to be nonmagnetic as shown by areas 149 and 150. The magnetic film and the patterned germanium areas 149 and 150 may be heated causing germanium to diffuse into the magnetic film and reduce the magnetization or the magnetic moment of the magnetic film in the areas 149 and 150. Areas 149 and 150, however, are conductive and provide a means for passing current through magnetic film 146 during times when magnetic resistive head 144 is operating. The output of magnetic film 146 is $\Delta/R$ where $\Delta/R$ is a change of resistance of magnetic film 146 and R is the resistance of the current path from area 149 to area 150 including the resistance of area 149 and area 150. Areas 149 and 150 are large enough to permit a low ohmic contact to respective areas for passing current through magnetic film 146. It may be seen by patterning germanium that the width shown by arrow 148 may be accurately determined by the pattern of the germanium and the diffusion depths or lengths of germanium during annealing. It is noted that mechanically, areas 149 magnetic film 146 and area 150 are part of one film.

The dimensions and properties of the magneto-resistive head can be modified or trimmed by focussed beam heating to cause a reduction in the magnetic moment in localized regions of the magneto-resistive film.

While the present invention has been shown and described with respect to specific embodiments, it is not thus limited. Numerous modifications, changes, and improvements will occur which fall within the spirit and scope of the invention.

Having thus described my invention, what we claim as new and desire to secure by Letters Patent is:

1. A ferromagnetic structure comprising first and second regions having a diffusion defined boundary interface therebetween, said first region being composed of a first material having a ferromagnetic property, and said second region being composed of a second material that is substantially not ferromagnetic, said second region being composed of said first material into which atoms of silicon or germanium have been diffused, after formation of said second region, in sufficient quantity to substantially destroy said ferromagnetic property of said first material in said second region and define said boundary interface.

2. A ferromagnetic structure as defined in claim 1 wherein said first material is selected from the group consisting of nickel, iron, cobalt and alloys thereof.

3. A ferromagnetic structure as defined in claim 1 wherein said second region contains atoms of silicon or germanium and atoms of said ferromagnetic material in approximately a stochiometic ratio.

4. A magnetic recording head comprising first and second regions having a diffusion defined boundary interface therebetween, said first region being composed of a first material having a ferromagnetic property, and said second region being composed of a second material that is substantially not ferromagnetic, said second region being composed of said first material into which atoms of silicon or germanium have been diffused, after formation of said second region, in sufficient quantity to substantially destroy said ferromagnetic property of said first material in said second region and define said boundary interface.

5. A magnetic recording head as defined in claim 4 wherein said first material is selected from the group consisting of nickel, iron, cobalt and alloys thereof.

6. A magnetic recording head as defined in claim 4 wherein said second region contains atoms of silicon or germanium and atoms of said ferromagnetic material in approximately a stochiometic ratio.

7. A magnetic recording film comprising first and second regions having a diffusion defined boundary interface therebetween, said first region being composed of a first material having a ferromagnetic property, and said second region being composed of a second material that is substantially not ferromagnetic, said second region being composed of said first material into which atoms of silicon or germanium have been diffused, after formation of said second region, in sufficient quantity to substantially destroy said ferromagnetic property of said first material in said second region and define said boundary interface.

8. A magnetic recording film as defined in claim 7 wherein said first material is selected from the group consisting of nickel, iron, cobalt and alloys thereof.

9. A magnetic recording film as defined in claim 7 wherein said second region contains atoms of silicon or germanium and atoms of said ferromagnetic material in approximately a stochiometic ratio.

10. A magnetic recording film as defined in claim 7 wherein said first region is a recording track and said second region is a nonmagnetic guard band adjacent to said recording track.

* * * * *